US009940228B2

(12) United States Patent
Corrie (10) Patent No.: US 9,940,228 B2
(45) Date of Patent: Apr. 10, 2018

(54) PROACTIVE MEMORY RECLAMATION FOR JAVA VIRTUAL MACHINES

(75) Inventor: Benjamin J. Corrie, San Francisco, CA (US)

(73) Assignee: VMware, Inc., Palo Alto, CA (US)

(*) Notice: Subject to any disclaimer, the term of this patent is extended or adjusted under 35 U.S.C. 154(b) by 640 days.

(21) Appl. No.: 13/523,848

(22) Filed: Jun. 14, 2012

(65) Prior Publication Data

US 2013/0339568 A1    Dec. 19, 2013

(51) Int. Cl.
| G06F 12/00 | (2006.01) |
| G06F 12/02 | (2006.01) |
| G06F 9/455 | (2018.01) |

(52) U.S. Cl.
CPC ........ *G06F 12/023* (2013.01); *G06F 9/45558* (2013.01); *G06F 12/0253* (2013.01); *G06F 2009/45583* (2013.01); *G06F 2212/151* (2013.01)

(58) Field of Classification Search
CPC .......... G06F 12/0253; G06F 2212/151; G06F 2009/45583; G06F 9/45558
USPC ............................................. 711/6
See application file for complete search history.

(56) References Cited

U.S. PATENT DOCUMENTS

| 5,493,663 | A  | 2/1996  | Parikh |
| 5,606,685 | A  | 2/1997  | Frandeen |
| 6,202,127 | B1 | 3/2001  | Dean et al. |
| 6,496,912 | B1 | 12/2002 | Fields, Jr. et al. |
| 6,789,156 | B1 | 9/2004  | Waldspurger |
| 7,412,492 | B1 | 8/2008  | Waldspurger |
| 7,421,533 | B2 | 9/2008  | Zimmer et al. |
| 7,433,951 | B1 | 10/2008 | Waldspurger |
| 7,472,252 | B2 | 12/2008 | Ben-Zvi |
| 7,500,048 | B1 | 3/2009  | Venkitachalam et al. |
| 7,640,543 | B2 | 12/2009 | Vij et al. |
| 7,702,843 | B1 | 4/2010  | Chen et al. |
| 7,716,446 | B1 | 5/2010  | Chen et al. |
| 7,797,699 | B2 | 9/2010  | Kagi et al. |
| 7,870,153 | B2 | 1/2011  | Croft et al. |
| 7,886,126 | B2 | 2/2011  | Bennett et al. |
| 8,095,931 | B1 | 1/2012  | Chen et al. |

(Continued)

OTHER PUBLICATIONS

Patent Cooperation Treaty, "International Search Report", issued in connection with International Patent Application No. PCT/US2011/042388, dated Aug. 30, 2011 (3 pages).

(Continued)

*Primary Examiner* — Kalpit Parikh
(74) *Attorney, Agent, or Firm* — Patterson & Sheridan, LLP (57) ABSTRACT

A mechanism is provided for managing memory of a virtual machine having a runtime environment executing therein. The runtime environment includes a balloon agent that allocates memory objects within heap memory of the runtime environment and hints to a hypervisor that machine memory pages backing the memory objects may be candidates for page sharing. At launch of the runtime environment, the balloon agent allocates memory objects in response to detecting a state of high machine memory consumption by the virtual machine. Further, while the runtime environment is running, the balloon agent allocates memory objects within heap memory when the runtime environment becomes idle.

20 Claims, 6 Drawing Sheets

(56) References Cited

U.S. PATENT DOCUMENTS

| | | |
|---|---|---|
| 8,156,492 B2 | 4/2012 | Dahlstedt |
| 8,359,451 B2 | 1/2013 | Chen et al. |
| 8,543,790 B2 | 9/2013 | Chen et al. |
| 8,583,875 B1 | 11/2013 | Garthwaite et al. |
| 8,949,295 B2 | 2/2015 | McDougall et al. |
| 9,015,203 B2 | 4/2015 | Corrie |
| 2001/0044856 A1 | 11/2001 | Agesen et al. |
| 2002/0019716 A1 | 2/2002 | Agesen et al. |
| 2003/0212719 A1 | 11/2003 | Yasuda et al. |
| 2005/0232192 A1* | 10/2005 | Rawson, III ............. 370/329 |
| 2005/0262505 A1 | 11/2005 | Esfahany et al. |
| 2006/0004944 A1 | 1/2006 | Vij et al. |
| 2006/0064697 A1 | 3/2006 | Kagi et al. |
| 2006/0161719 A1 | 7/2006 | Bennett et al. |
| 2007/0038837 A1 | 2/2007 | Ben-Zvi |
| 2007/0136402 A1 | 6/2007 | Grose et al. |
| 2007/0192329 A1 | 8/2007 | Croft et al. |
| 2009/0070776 A1 | 3/2009 | Dahlstedt |
| 2010/0211754 A1 | 8/2010 | Crosby et al. |
| 2010/0241785 A1 | 9/2010 | Chen et al. |
| 2011/0138147 A1* | 6/2011 | Knowles ............ G06F 9/5016 711/170 |
| 2011/0320682 A1* | 12/2011 | McDougall ......... G06F 12/023 711/6 |
| 2012/0110577 A1 | 5/2012 | Chen et al. |
| 2012/0185854 A1 | 7/2012 | Dahlstedt |
| 2012/0233435 A1 | 9/2012 | Ben-Yehuda et al. |
| 2013/0132957 A1 | 5/2013 | Chen et al. |
| 2013/0218644 A1 | 8/2013 | Kasravi et al. |
| 2013/0290382 A1 | 10/2013 | Adachi et al. |
| 2013/0290596 A1 | 10/2013 | Corrie |
| 2013/0339568 A1 | 12/2013 | Corrie |

OTHER PUBLICATIONS

Patent Cooperation Treaty, "Written Opinion of the International Search Authority," issued in connection with International Patent Application No. PCT/US2011/042388, dated Aug. 30, 2011 (4 pages).

Patent Cooperation Treaty, "International Preliminary Report on Patentability," issued in connection with International Patent Application No. PCT/US2011/042388, dated Jan. 8, 2013 (5 pages).

Heo et al., Memory overbooking and dynamic control of Xen virtual machines consolidated environments, ASPOLOS Resolve-Workshop on Runtime Environments/Systems, Layering and Virtualized Environments, 2011.

Schwidefsky et al., Collaborative Memory Management in Hosted Linux Environments:, Proceedings of the Linux Symposium, vol. 2, pp. 313-328,206.

Tauber, "Automation and Optimization in IT-DB Oracle VM virtualization Systems", CERN openlab, Aug. 20, 2010.

C.A. Waldspurger, Memory Resource Management in VMWare ESX Server Proceedings of the 5th Symposium on Operating Systems Design and Implementation (OSDI 2002), AMC Operating Systems Review, pp. 181-194, Dec. 2002.

Gordon et al., "Ginko Automated, Application-Driven Memory Overcommitment for Could Computing", ASPOLOS Resolve-Workshop on Runtime Environments/Systems, Layering and Virtualized Environments, 2011.

* cited by examiner

PROACTIVE MEMORY RECLAMATION FOR JAVA VIRTUAL MACHINES

BACKGROUND

Virtual computing environments allow multiple virtual machines (VMs) to run on a single physical platform (also referred to herein as a "host") and to share physical resources. Some virtual computing environments enable configuration of VMs such that the total amount of memory designated for use by the VMs is larger than the actual amount of memory available on the host. Referred to as memory over-commitment, this feature enables the host to support the simultaneous execution of more VMs. To achieve over-commitment, the virtual computing environment simply gives a VM less memory than what the guest operating system (OS) in the VM believes it has.

Memory over-commitment is traditionally enabled using a technique known as ballooning, which is described in U.S. Pat. No. 7,433,951, the entire contents of which are incorporated by reference herein. A balloon is a resource reservation application that runs as a guest application in the VM or as driver in the guest OS that requests guest physical memory from the guest OS. After the guest OS has allocated guest physical memory for use by the balloon application, the balloon application is able to ultimately communicate information regarding the allocated guest physical memory to a hypervisor that supports the VM, which is then able to repurpose the host's system memory (also referred to herein as "machine memory") backing the guest physical memory allocated to the balloon application. That is, since the balloon application only reserves guest physical memory but does not actually use it, the hypervisor can, for example, repurpose machine memory that backs such allocated guest physical memory for use by another VM without fear that the balloon application would write to the guest physical memory (and therefore the backed machine memory).

Another technique for memory management that is useful under memory over-commitment situations is referred to as page sharing. In this technique, the hypervisor identifies and eliminates redundant copies of guest physical memory pages across VMs by mapping the identical guest physical pages to the same machine memory page and enabling copy-on-write for that machine memory page. This technique enables sharing of memory between VMs in cases where VMs may be running instances of the same guest OS, applications, and libraries, and have other data in common.

Unfortunately, there are applications and runtime environments that do not work well with conventional memory over-commitment in virtual computing environments. Java Virtual Machine (JVM) is one of the most widely used runtime environments in this category. JVMs typically have their own memory management mechanisms. Allocated Java objects sit in a JVM heap until the JVM runs out of heap space, and in this event, garbage collection sweeps the heap and recycles dead objects, which are unreachable from the program. A memory-managed JVM runtime can be a problematic candidate for memory over-commitment in a virtual computing environment because freed memory made available by garbage collection is typically held exclusively for use by the runtime and therefore cannot be used by other applications running in the virtual computing environment. In addition, attempts to over-commit the memory may result in lack of memory to support the JVM heap, causing a significant performance hit on the JVM runtime.

Recent advances in memory-managed JVM runtimes have used a ballooning-type mechanism incorporated into the JVM runtime. To "inflate" the JVM balloon, objects are inserted into heap memory reserved for the JVM runtime and the JVM runtime's own memory management techniques, such as garbage collection, are relied upon to free and clear up available memory space. However, relying on such ballooning mechanisms in the JVM runtime requires carefully pre-configured conditions to exist on the host system. A system administrator has to deliberately choose to over-commit memory and set up real or synthetic memory constraints on the VMs in order for memory ballooning to occur. Particularly, the system administrator has to determine what level of memory over-commitment is appropriate for the given workloads expected in the VMs and JVM runtimes. Too much memory over-commitment and performance suffers; too little, and few benefits are realized. As such, this procedure for determining levels of memory over-commitment can be largely trial and error and time-consuming for system administrators.

SUMMARY

One or more embodiments of the present disclosure provide methods, systems, and computer programs for managing memory in a host computer system in which a runtime environment (e.g., JVM) executes within one or more virtual machines (VMs) provisioned in the host computer system, where a balloon agent that is part of a runtime environment (e.g., JVM) is configured to allocate memory objects within heap memory of the runtime environment to enable a hypervisor to reclaim machine memory. In one embodiment, upon launch of the runtime environment and upon detecting a state of high machine memory consumption for the virtual machine, the balloon agent may "flash" the heap memory and allocate memory objects having zeroed data to enable the hypervisor to reclaim memory allocated to such memory objects through page sharing. In another embodiment, upon detecting the runtime environment has become idle, the balloon agent may "leak" objects into heap memory by gradually allocating memory objects having zeroed data that may be page-shared as a way to trigger a garbage collection of heap memory.

A method for managing memory of a virtual machine, according to one embodiment, includes determining an idle state of a runtime environment executing in the virtual machine. The method includes determining an idle state of a runtime environment executing in the virtual machine, and responsive to determining the idle state, allocating a plurality of memory objects within heap memory of the runtime environment at a pre-determined allocation rate while the runtime environment remains in the idle state. The method further includes writing a predetermined value into at least one machine memory page associated with the allocated memory objects, and notifying a hypervisor that the at least one machine memory page that are associated with the allocated memory objects and have the predetermined value can be reclaimed.

According to another embodiment, a method for managing memory of a virtual machine is provided that includes launching a runtime environment configured to support execution of one or more applications. The method includes determining a state of high machine memory consumption for the virtual machine. The state of high machine memory consumption may be characterized by an amount of guest physical memory being backed by machine memory in excess of a threshold value. The method further includes, responsive to determining the state of high machine memory consumption for the virtual machine, allocating a memory object within heap memory of the runtime environment, the memory object having a predetermined value. The method further includes notifying a hypervisor that at least one machine memory page associated with the allocated memory object having the predetermined value can be reclaimed.

Further embodiments of the present invention include, without limitation, a non-transitory computer-readable storage medium that includes instructions that enable a processing unit to implement one or more of the methods set forth above or the functions of the computer system set forth above.

DETAILED DESCRIPTION

Figure 1:
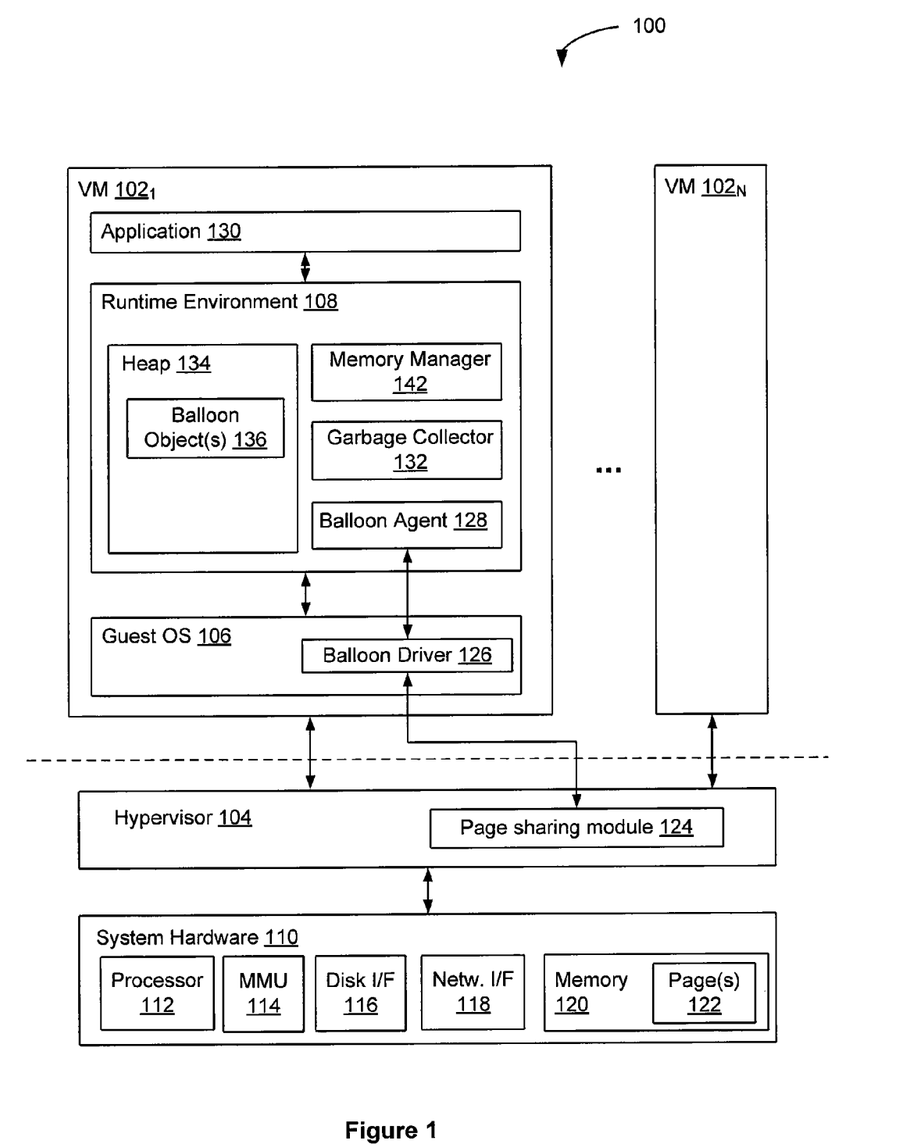
FIG. 1 is a block diagram that illustrates a virtualized computer system with which one or more embodiments of the present invention may be utilized.

FIG. 1 is a block diagram that illustrates a virtualized computer system 100 with which one or more embodiments of the present invention may be utilized. Computer system 100 (also referred to as a "server" or "host") is configured to support a virtualized environment comprised of one or more virtual machines.

As in conventional computer systems, computer system 100 includes both system hardware 110 and system software. System hardware 110 generally includes a processor 112, some form of memory management unit (MMU) 114 (which may be integrated with processor 112), a disk interface 116, a network interface 118, and memory 120 (referred to herein as "machine memory"). Machine memory 120 stores data and software such as an operating system and currently running application programs. Generally, MMU 114 is responsible for managing a virtual memory for processes running in computer system 100 by mapping virtual memory pages to machine memory pages. MMU 114 typically divides virtual memory address space and machine memory address space into blocks of contiguous memory addresses referred to as memory pages 122. Processor 112 may be a single processor, or two or more cooperating processors in a known multiprocessor arrangement. Examples of disk interface 116 are a host bus adapter and a network file system interface. An example of network interface 118 is a network adapter, also referred to as a network interface controller (NIC). In some embodiments, a plurality of NICs is included as network interface 118. It should further be recognized that system hardware 110 also includes, or is connected to, conventional registers, interrupt handling circuitry, a clock, etc., which, for the sake of simplicity, are not shown in the figures.

One or more virtual machines (VMs), represented by VM $102_1$ to VM $102_N$, are configured within computer system 100 and share the hardware resources of computer system 100. Each virtual machine typically includes a guest operating system (OS) 106 and virtualized system hardware (not shown), which includes one or more virtual CPUs, virtual system memory, one or more virtual disks, one or more virtual devices, etc., all of which are implemented in software to emulate the corresponding components of an actual computer.

The virtual machines run on top of a hypervisor 104 (sometimes referred to as a virtual machine monitor, or VMM), which is a software interface layer that abstracts system hardware 110 into virtualized hardware, thereby enabling sharing of system hardware 110 of computer system 100 amongst the virtual machines. Hypervisor 104 acts as an interface between VM $102_1$ and system hardware 110 for executing VM-related instructions and for transferring data to and from machine memory 120, processor(s) 112, disk interface 116, etc. Hypervisor 104 may run on top of an operating system of computer system 100 or directly on hardware components of computer system 100.

In one embodiment, hypervisor 104 includes a page sharing module 124 configured to perform a page sharing process, according to one embodiment, on guest physical memory pages utilized by VM $102_1$. As described in detail later, page sharing module 124 is configured to re-map guest physical memory pages assigned to VM $102_1$ and runtime environments 108 having the same contents to a same machine memory page 122. For clarity of discussion, the term machine memory refers to actual hardware memory that is visible to hypervisor 104. The term guest physical memory refers to a software abstraction used to provide the illusion of hardware memory to a VM. Guest physical memory is generally visible to a guest OS running on a VM. Guest physical memory is backed by machine memory and hypervisor 104 provides a mapping from guest physical memory to machine memory. The term guest virtual memory refers to a continuous virtual address space presented by a guest OS to applications running inside a VM.

VM $102_1$ is configured to support a runtime environment 108 running on top of guest OS 106. Runtime environment 108 supports execution of one or more applications (e.g., application 130) that provide, for example, web services, database services, and other information technology services that may involve retrieval, processing, and serving of data to one or more users. To simplify the description, description of other VMs $102_N$ are omitted but it should be understood that VMs $102_N$ are configured similarly to VM $102_1$. In the embodiments illustrated herein, runtime environment 108 is a Java Virtual Machine (JVM), although it should be recognized that other runtime environments and/or applications executing on top of the guest OS and having their own memory manager, such as databases, web servers, etc., may be used without departing from the scope of the teachings herein. The embodiments presented should therefore not be interpreted to be exclusive or limiting, but rather exemplary or illustrative.

A memory manager 142 of runtime environment 108 handles memory used by and during execution of application 130. Memory manager 142 may allocate memory from a portion of guest physical memory specifically reserved for runtime environment 108, sometimes referred to as heap memory, and embodied in FIG. 1 as heap 134. Heap 134 is configured to store one or more objects (e.g., Java objects) and other data structures utilized during execution of application 130. When heap 134 runs out of space, garbage collector 132 may initiate a garbage collection process wherein dead objects (i.e., objects no longer reachable or used by applications 130) are cleared to create free space and live objects may be compacted. In some embodiments, rather than only wait for heap 134 to be out of space before collecting garbage, memory manager 142 may include a concurrent garbage collector that constantly collects garbage within heap 134.

Runtime environment 108 of VM $102_1$ is configured to coordinate with hypervisor 104 to manage memory using a mechanism that performs page sharing procedures on guest physical memory pages utilized by runtime environment 108. According to an embodiment, VM $102_1$ includes a balloon driver 126 installed in guest OS 106 and a balloon agent 128 within runtime environment 108. Balloon driver 126 is a systems-level driver configured to communicate with hypervisor 104 and balloon agent 128 to exert memory pressure on runtime environment 108. Balloon agent 128 is a thread or process executing within runtime environment 108 configured to exert memory pressure on the heap memory of runtime environment 108.

Responsive to commands and/or signals provided by hypervisor 104 via balloon driver 126, balloon agent 128 "inflates" a memory balloon by allocating balloon objects within heap memory, thereby effectively reducing the heap space that can be used by runtime environment 108 and any applications 130 running therein. An example technique for implementing balloon memory is further described in more detail in U.S. patent application Ser. No. 12/826,389, filed Jun. 29, 2010, and entitled "Cooperative Memory Resource Management via Application-Level Balloon," which is incorporated herein by reference.

In one embodiment, in addition to conventional memory ballooning, balloon agent 128 is configured to provide a mechanism for proactively reclaiming guest physical memory reserved for runtime environment 108 when VM $102_1$ is in a state of high machine memory consumption. In some embodiments, balloon agent 128 may initialize guest physical memory reserved for runtime environment 108 when runtime environment 108 is launched by VM $102_1$ that is in a state of high machine memory consumption, as described further in conjunction with FIG. 3.

In another embodiment, balloon agent is configured to passively reclaim guest physical memory when runtime environment 108 is in a state of inactivity, as described below in conjunction with FIG. 5. Balloon agent 128 is configured to request allocation of one or more balloon objects 136 in heap memory. Rather than be allocated to satisfy a request from hypervisor 104 (as in conventional memory ballooning mentioned above), balloon objects 136 are allocated based on internal conditions of VM $102_1$ and runtime environment 108, such as a state of high machine memory consumption and/or inactivity by runtime environment 108. The allocated balloon objects 136 may be given a predetermined value, such as zeroed data, that may be page shared using page sharing module 124. The shared memory pages may be reclaimed by hypervisor 104 and used for other processes, threads, applications, virtual machines, etc. It should be recognized that under certain schemes of accounting by hypervisor 104, guest physical memory reserved for balloon objects 136 may accounted for differently than "balloon memory" allocated to satisfy requests from hypervisor 104.

Proactive Memory Reclamation Upon Startup of JVM

FIGS. 2A-2D illustrate a memory profile 200 for VM $102_1$ executing in host 100 upon launch of runtime environment 108, according to one or more embodiments. For sake of illustration, memory profile 200 is depicted as a vertical stack of memory usage for VM $102_1$ and data (illustrated as data objects 202) used by VM $102_1$ residing therein. Increased memory usage is depicted as extending downward, while decreased memory usage shortens memory profile 200. The bottom bound of memory profile 200 represents an amount of guest memory (e.g., virtual RAM or "vRAM") granted to and reserved for use by VM $102_1$. "Consumed memory" may refer to the amount of machine memory on host 100 backing physical memory in the guest that is not shared, ballooned, or swapped. In one implementation, the amount of consumed memory may be determined as the amount of memory granted to VM $102_1$ less any memory saved due to page sharing and other memory sharing techniques mentioned above. In FIGS. 2A-2D, the amount of consumed memory is illustrated by the bottom bound of VM $102_1$ and is denoted by a directional arrow labeled "Consumed Memory."

Figure 2:
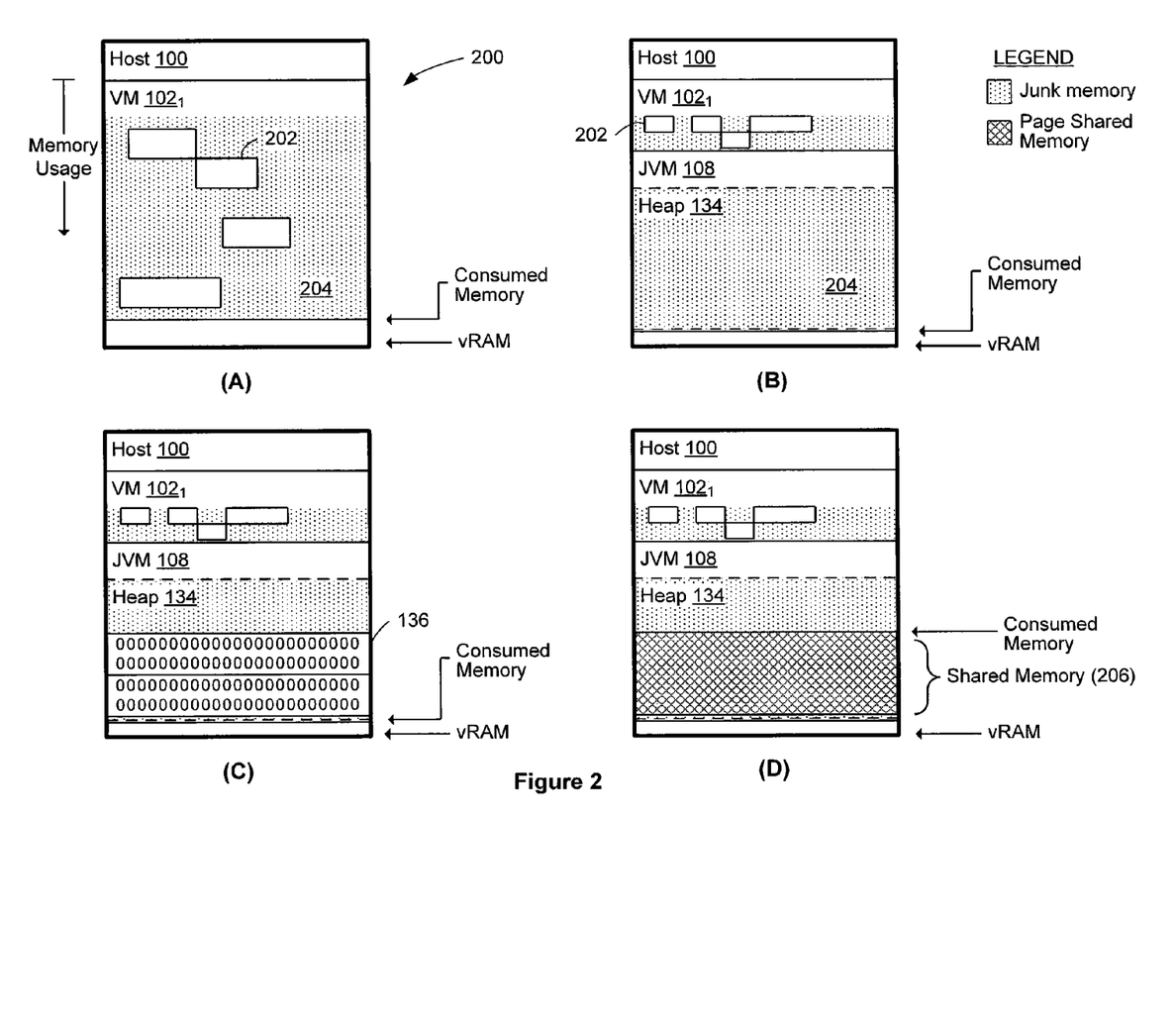
FIGS. 2A-2D illustrate a memory profile for a virtual machine executing a runtime environment, according to one or more embodiments.

FIG. 2A depicts a state of memory profile 200 for VM $102_1$ in which VM $102_1$ is consuming all or nearly all of configured vRAM. In some cases, a VM's memory consumption on host 100 will start at 0 (at the moment of being powered on) and extends towards its configured vRAM over time for a number of reasons, such as high peak memory usage of applications on the guest, OS buffer cache bloat, and frequent turnover of guest processes. As such, machine memory consumption by VM $102_1$ grows until a state of high machine memory consumption is reached. In operation, guest OS 106 of VM $102_1$ may dynamically allocate (e.g., via malloc) and free guest memory for use by applications (e.g., running on guest OS 106). For example, data objects 202 represent memory used by guest OS 130, applications, and other processes executing on guest OS 130. It should be recognized that during execution of VM $102_1$ portions of guest memory (denoted as regions 204) may contain "junk data" having arbitrary unknown values left over from past usage by VM $102_1$. As such, FIG. 2A illustrates data objects 202 intermixed with regions 204 of junk data.

When VM $102_1$ launches runtime environment 108, VM $102_1$ may reserve memory for use by runtime environment 108 within guest physical memory. FIG. 2B depicts a state of memory profile 200 for VM $102_1$ after runtime environment 108 (e.g., JVM) is launched. As shown, runtime environment 108 and a corresponding heap 134, inter alia, may occupy a portion of guest memory reserved for VM $102_1$. For clarity of illustration, it may be assumed that data objects 202 may be re-located, shifted, paged, and/or memory managed to make room for runtime environment 108. As shown in FIG. 2B, though a contiguous region of guest memory is now reserved for heap 134, portions of the contiguous region may still contain junk data left over from previous usage by VM $102_1$ (e.g., region 204).

According to one embodiment, upon launch of runtime environment 108, balloon agent 128 allocates one or more balloon objects 136 within heap memory 134, as depicted in FIG. 2C. The guest physical memory pages mapped to balloon objects 136 may be zeroed out and hinted to page sharing module 124 as candidates for page sharing.

FIG. 2D depicts a state of memory profile 200 for VM $1021$ after the guest physical memory pages backing balloon objects 136 are successfully page shared. Assuming that consumed memory accounts for the amount of memory granted to VM $102_1$ less the amount of shared memory, the amount of consumed memory can thereby be reduced. The operations of balloon agent 128 are described further in conjunction with FIG. 3.

Figure 3:
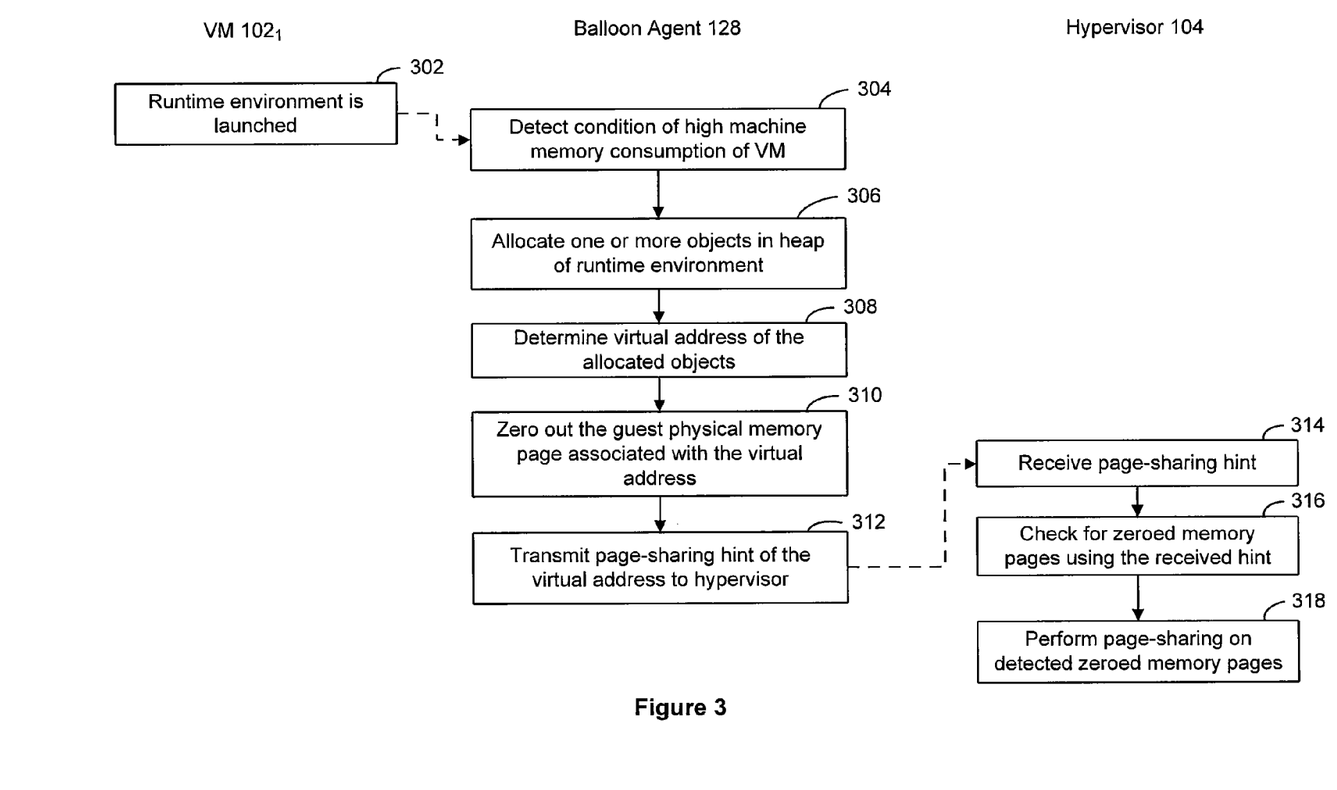
FIG. 3 is a flow diagram that illustrates steps for a method for reclaiming memory during initialization of a runtime environment, according to an embodiment of the present disclosure.

FIG. 3 is a flow diagram that illustrates steps for a method for reclaiming memory during initialization of runtime environment 108, according to an embodiment of the present disclosure. It should be recognized that, even though the method is described in conjunction with the system of FIG. 1, any system configured to perform the method steps is within the scope of embodiments of the invention.

At 302, VM $102_1$ launches runtime environment 108. At time of launch, guest OS 106 may have been previously running other applications and utilizing a substantial amount of guest memory such that VM $102_1$ may have a high level of machine memory consumption (e.g., consumption on host 100).

At 304, balloon agent 128 of runtime environment determines whether a condition of high machine memory consumption exists for VM $102_1$. Balloon agent 128 may determine a condition of high machine memory consumption according to one or more performance metrics associated with VM $102_1$, which were retrieved from hypervisor 104. Examples of performance metrics available from hypervisor 104 include metrics for consumed memory, guest physical memory that is mapped to machine memory (e.g., "granted memory"), guest physical memory that is actively used (e.g., "active memory"), guest physical memory shared with other VMs through page-sharing (e.g., "shared memory"), etc. In some embodiments, balloon agent 128 may calculate consumed memory as a percentage of the total vRAM allocated to VM $102_1$, and characterize a high machine memory consumption state should the percentage of consumed memory exceed a pre-determined threshold value. For example, in a case where VM $102_1$ is configured to have 8 GB of total vRAM and is consuming 7.5 GB of memory, balloon agent 128 may deem 93.75% (7.5/8=0.9375) of consumed memory as indicative of a state of high machine memory consumption.

At 306, responsive to determining that consumed memory is high, balloon agent 128 allocates one or more balloon objects 136 in heap memory of runtime environment 108. Balloon objects 136 encapsulate one or more regions within heap 134 that may be used for memory reclamation. In some embodiments, the data region for each balloon object 136 is configured in a format that balloon agent 128 may determine a page address of an underlying guest physical memory page within heap 134, e.g., via a Java Native Interface (JNI) call. In the embodiment shown in FIG. 2C, the region of data for balloon objects 136 is arranged as a byte array data structure having zeroed out data. It should be recognized that other suitable data structures and formats wherein a given runtime environment supports a lookup of an underlying memory address for the data structure may be utilized.

In one embodiment, balloon agent 128 may allocate balloon objects 136 having a total size based on the total size of heap 134. In some embodiments, balloon agent 128 may allocate balloon objects 136 that occupy a majority (e.g., greater than 50%) of space reserved for heap 134. For example, if runtime environment 108 is configured to have a heap size of 2 GB, on startup, balloon agent 128 may allocate two balloon objects of 750 MB each.

In one embodiment, balloon agent 128 may configure references to balloon objects 136 to be weak- or soft-referenced, rather than be strong-referenced. Generally, a "strong" reference may be counted by garbage collector 132 under a reference counting scheme and generally protects an object from garbage collection. In contrast, "weak" or "soft" references to an object may not be counted by garbage collector 132, and therefore may not protect an object from garbage collection even though the referenced object may still be a live object. For example, garbage collector 132 may free up any weak-referenced objects, while any soft-referenced objects may be freed at the discretion of garbage collector 132 according to memory demands and internal memory policies of garbage collector 132. In one embodiment, balloon agent 128 maintains weak references to balloon objects 136 to permit any subsequent garbage collections to free balloon objects 136.

It has been determined that allocation of balloon objects 136 (e.g., at step 306) may exhaust available heap memory, thereby causing a near-immediate garbage collection of weakly-referenced balloon objects 136. Nonetheless, even though balloon objects 136 may be garbage collected, zeroed data values remain in the underlying guest physical memory and can be reclaimed by hypervisor 104, described below. As such, balloon objects 136 function as a mechanism for writing zeroed data values in guest physical memory.

At step 308, balloon agent 128 determines the virtual addresses of allocated balloon objects 136. In one embodiment, at 310, balloon agent 128 zeroes out the guest physical memory pages associated with the virtual addresses. Zeroing out the guest physical memory pages associated with balloon objects 136 overwrites the junk data that may be residing in portions of guest memory (e.g., region 204). In some embodiments, runtime environment 108 may be configured to automatically initialize balloon objects 136 (with zeros) upon allocation (e.g., at step 306). As such, junk data (e.g., in region 204) is written over when balloon object 136 is created. As such, balloon agent 128 "flashes" heap memory 134 by creating (short-lived) weakly-referenced objects in heap 134 that leave behind useful zeroed data values, thereby enabling portions of heap 134 to be reclaimed by hypervisor 104.

Optionally, at step 312, balloon agent 128 transmits an indication, or "hint," to hypervisor 104 that the guest physical memory pages backing balloon objects 136 may be candidates for page-sharing. In one implementation, balloon agent 128 may notify hypervisor 104 of the one or more guest physical memory pages associated with balloon objects 136 via a backdoor call. The backdoor call may include the virtual address of the guest physical memory pages. In some implementations, balloon agent 128 may notifies balloon driver 126, which in turn notifies page sharing module 124 of hypervisor 104. At 314, hypervisor 104 receives the page-sharing hint from balloon agent 128.

In an operational mode sometimes referred to as "passive page sharing" or "transparent page sharing," page sharing module 124 routinely scans through guest physical memory backing VMs $102_1$ to $102_N$ to check for memory pages that may be shared between and amongst virtual machines. Page sharing module 124 may maintain a queue of guest physical memory pages to be scanned and checked. In some embodiments, page sharing module 124 places virtual addresses for guest physical memory pages backing balloon objects 136 (as provided by the page-sharing hint) onto such a queue of memory pages to be examined for page sharing.

At 316, page sharing module 124 checks for zeroed memory pages using the virtual addresses provided by the received hint. In some embodiments, page sharing module 124 may identify the zeroed memory pages during the course of its own periodic scans of guest physical memory. In some embodiments, page sharing module 124 generates hash values based on a candidate guest physical memory page's content. The hash values may be used as a key in a lookup table to match a candidate guest physical page with an existing entry. Page sharing module 124 may perform a full comparison of the page contents to verify the match and avoid any false matches.

At 318, page sharing module 124 performs a page-sharing operation on the detected zeroed memory pages, as described in detail in U.S. patent application Ser. No. 12/826,389, specified above. For example, page sharing module 124 may maps the hinted guest physical memory page with a matched guest physical memory page to a same machine memory page 122. Page sharing module 124 may modify one or more internal references in a page table to associate the hinted guest physical memory page with the matched memory page such that only one copy of the memory page needs be retained within machine memory 120. That is, only one copy of the data region within heap memory needs to be retained within machine memory 120. It is noted that if a later access attempts to modify the shared machine memory page 122 (e.g., later cache data) hypervisor 104 immediately makes a copy of the shared memory as per a copy-on-write (COW) technique. Hypervisor 104 reclaims a machine memory page 122 previously utilized by the hinted guest physical memory page assigned to runtime environment 108 and makes the de-allocated machine memory page available to other processes executing on host computer system 100, such as other VMs and/or other runtime environments 108.

Passive Memory Reclamation for Idle JVM

FIGS. 4A-4F illustrate memory profiles for VM $102_1$ executing in host 100 having runtime environment 108 executing thereon, according to one or more embodiments. For sake of illustration, the memory profiles are depicted as a vertical stack of memory usage for VM $102_1$ and runtime environment 108 executing therein. Increased memory usage is depicted as extending downward, while decreased memory usage "shortens" the memory profile.

Figure 4:
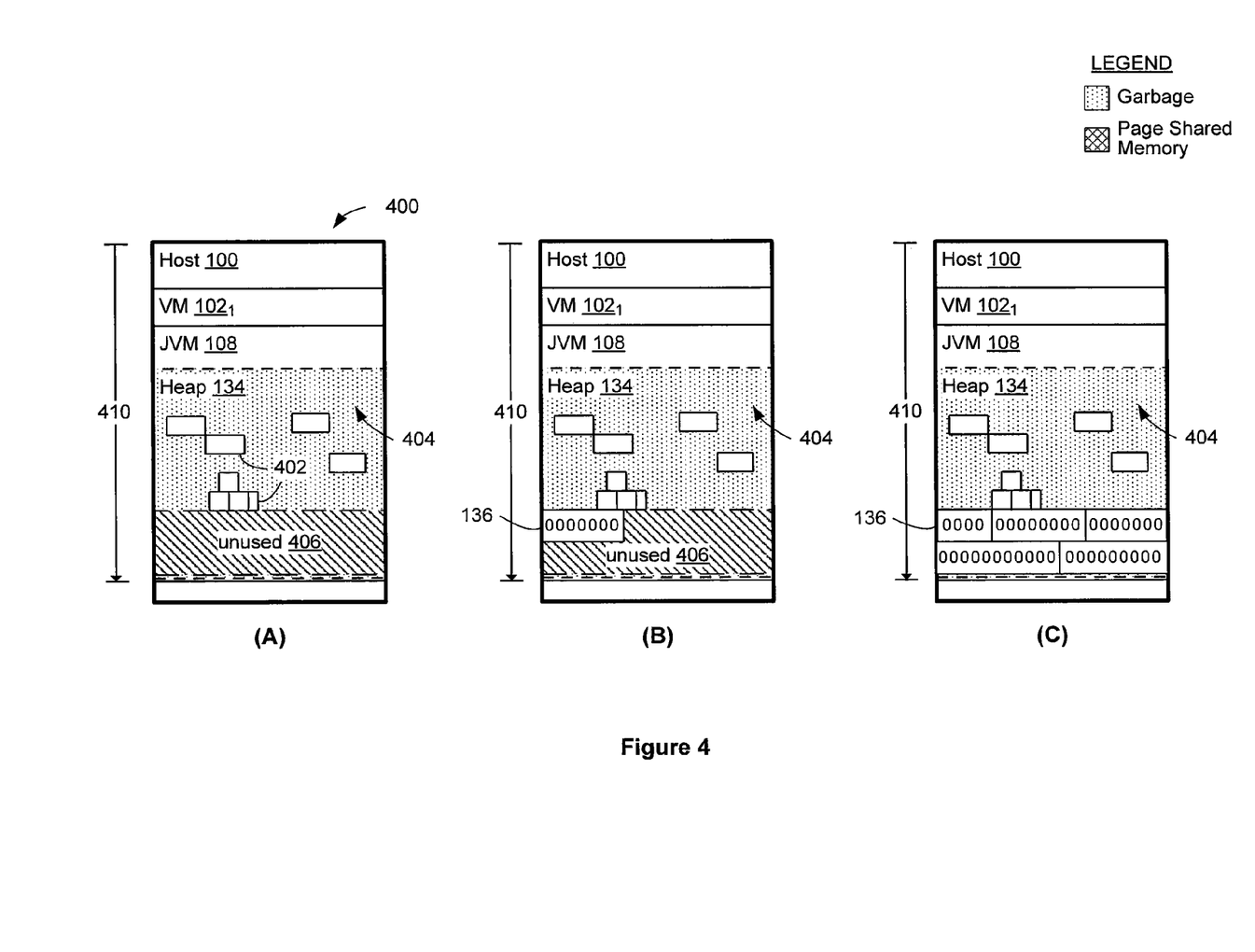
FIGS. 4A-4F illustrate a memory profile for a virtual machine executing a runtime environment, according to one or more embodiments.

FIG. 4A depicts a memory profile 400 for VM $102_1$ having runtime environment 108 (e.g., JVM) executing therein. The bottom bound of memory profile 400 represents an amount of vRAM granted to and reserved for use by VM $102_1$. The amount of consumed memory may be determined as the amount of memory granted to VM $102_1$ less any memory saved due to page sharing and other memory sharing techniques mentioned above. In FIG. 4A, the amount of consumed memory is denoted by the directional arrow 410. As depicted, the amount of consumed memory is nearly equal to the amount of vRAM granted, and may be deemed a condition of high machine memory consumption.

A portion of memory allocated for runtime environment 108 is reserved for heap 134. Heap memory 134 includes application data 402 which includes objects actively used by applications (e.g., application 130) executed by runtime environment 108. Heap memory further includes garbage 404, which are data or objects no longer reachable or used by applications 130. Memory manager 142 allocates new objects from an unused region 406 of heap memory 134. When available memory from unused region 406 is exhausted, runtime environment 108 may initiate a garbage collection operation that frees garbage 404 and creates free space in heap memory 134. However, in some cases, runtime environment 108 may be idle for a period of time in which applications 130 generate little to no activity and little to no additional objects are created within heap 134 that might eventually trigger garbage collection. As such, contents of heap 134, including guest physical memory backing garbage 404, remain allocated to VM $102_1$ but are seldom used.

Notably, the state of guest physical memory containing large amounts of garbage 404 is needlessly maintained on host 100 for potentially long periods of time.

Embodiments of present disclosure provide a mechanism to gradually "leak" objects into heap memory of idle runtime environments at a slow rate over time to cause a cleanup of garbage and passively reclaim guest physical memory. In effect, an idle runtime environment 108 would, over time, be proactively cleaned up and large areas of heap memory be given back to hypervisor 104, thereby obviating the need for pre-configured memory constraints imposed by a system administrator to enable conventional memory ballooning. As depicted in FIG. 4B, responsive to inactivity of runtime environment 108, balloon agent 128 begins to allocate one or more balloon objects 136 having zeroed data in heap memory. Balloon agent 128 may allocate balloon objects 136 at a slow rate relative to typical object allocations for an actively running application. By way of example, assuming the allocation rate for balloon objects 136 is expressed in terms of balloon object size (e.g., kBs), balloon agent 128 may allocate 8 MB balloon objects at rate of 10 kB/s, or approximately one new balloon object 136 every 13 minutes. Over time, balloon objects 136 accumulate within heap memory 134. While runtime environment 108 remains idle, balloon agent 128 continues to "leak" balloon objects 136 into heap memory 134 until, as depicted in FIG. 4C, all available heap memory from unused region 406 has been used up.

When unused region 406 is exhausted, runtime environment 108 may initiate a garbage collection operation that may compact live objects (e.g., application data 402, even some balloon objects 136) and free garbage 404. As depicted in FIG. 4D, garbage collector 132 has freed garbage 404 from heap 134. As described above, even though some balloon objects 136 have been garbage collected, much of the guest physical memory pages backing heap 134 remains zeroed and may be page shared (as illustrated as region 408), and the amount of consumed memory is thereby reduced (as illustrated by arrow 412).

In FIG. 4E, if runtime environment 108 remains idle after garbage collection, balloon agent 128 resumes the creation of balloon objects 136 in heap memory 134, as illustrated by new balloon object 418, and more zeroed objects are written into the heap. In FIG. 5F, runtime environment 108 wakes up from its inactivity (e.g., due to an application 130 running therein, or due to external network signals) and writes data 420 within heap 134. In one embodiment, responsive to runtime environment 108 waking up, balloon agent 128 may release balloon objects 136 from its use. As such, the accumulation of balloon objects 136 advantageously permits reclamation of heap memory 134 (via passive page sharing) and eventually triggers garbage collection to free garbage 404. The operations of balloon agent 128 are described further in conjunction with FIG. 5.

Figure 5:
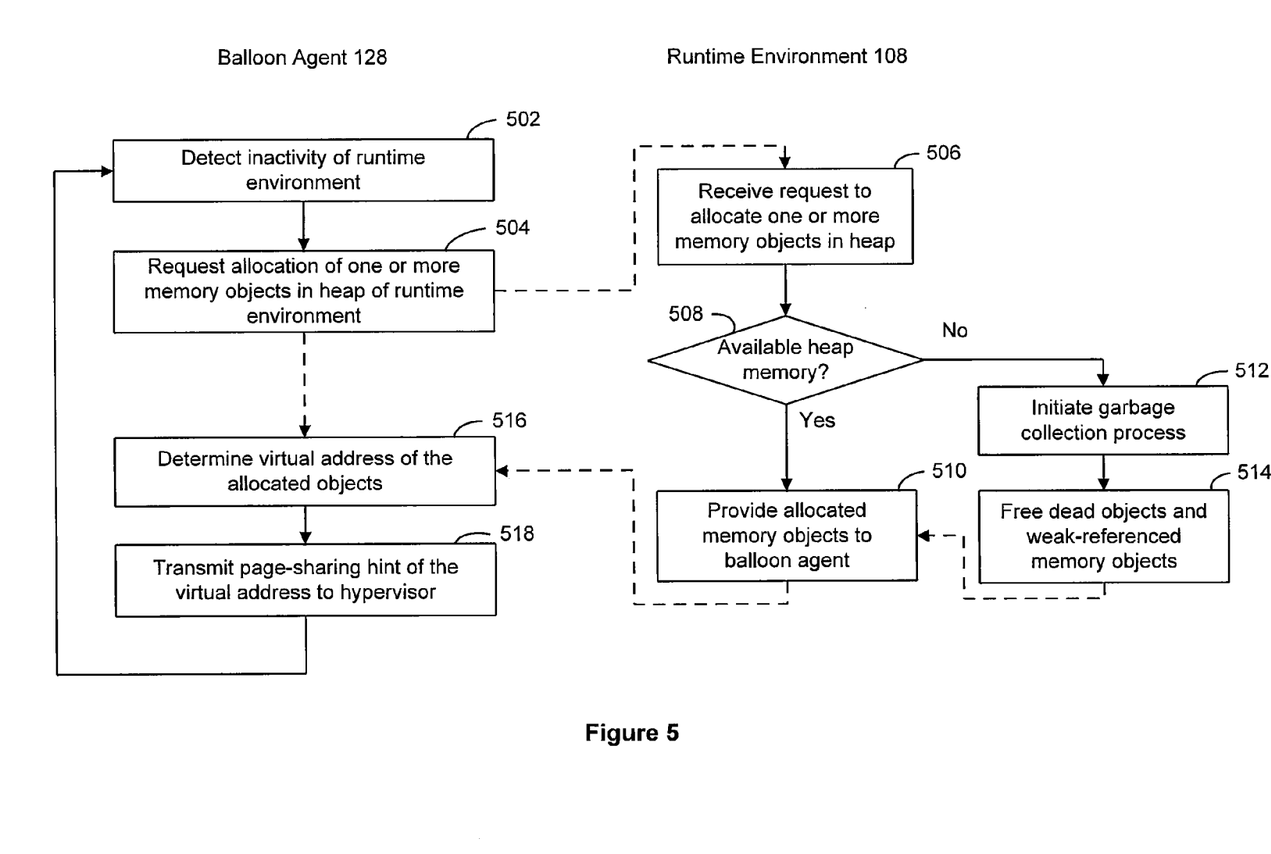
FIG. 5 is a flow diagram that illustrates steps for a method for reclaiming memory during execution of a runtime environment, according to an embodiment of the present disclosure.

FIG. 5 is a flow diagram that illustrates steps for a method for passively reclaiming memory reserved for runtime environment 108, according to an embodiment of the present disclosure. It should be recognized that, even though the method is described in conjunction with the system of FIG. 1, any system configured to perform the method steps is within the scope of embodiments of the invention.

At 502, balloon agent 128 detects inactivity of runtime environment 108 and enables a passive memory reclamation mode. Balloon agent 128 may determine inactivity of runtime environment 108 based on an allocation rate for application objects in heap 134. In some embodiments, balloon agent 128 may deem runtime environment 108 idle in response to determining little or no application objects have been allocated in heap 134 over a threshold period of time. In other embodiments, balloon agent 128 may deem runtime environment 108 idle in response to determining little to no CPU usage by runtime environment 108, as retrieved from hypervisor 104.

At step 504, responsive to determining runtime environment 108 is idle, balloon agent 128 requests allocation of one or more balloon objects 136 in heap 134 of runtime environment 108. As described above, balloon objects 136 encapsulate one or more regions within heap 134 that may be used for memory reclamation. In some embodiments, the data region for each balloon object 136 is configured in a format (e.g., byte array) that balloon agent 128 may determine a page address of an underlying guest physical memory page within heap 134, e.g., via a Java Native Interface (JNI) call. In some embodiments, balloon agent 128 may maintain weak or soft references to balloon objects 136 to permit any subsequent garbage collections to free balloon objects 136.

In one embodiment, balloon agent 128 requests allocation of balloon objects 136 at an allocation rate selected to gradually fill heap 134. In some embodiments, balloon agent 128 may create balloon objects 136 having a pre-determined size (e.g., 8 MB) at rate expressed in terms of balloon object size (e.g., kBs per unit time), such as 10 kB/s, or approximately one new balloon object every 13 minutes. It should be recognized that various techniques for dynamically determining an allocation rate and sizes for balloon objects 136 may be utilized, such as increasing the size of created balloon objects 136 over the course of passive reclamation mode.

At 506, runtime environment 108 receives the request to allocate one or more balloon objects 136 in heap 134. At 508, memory manager 142 determines whether any heap memory is available to satisfy the allocation request. At 510, responsive to determining that there is sufficient heap memory (e.g., from unused region 406), memory manager 142 reserves space within heap 134 and provides allocated balloon objects 136 back to balloon agent 128. Operations may then proceed to step 516. Alternatively, responsive to determining that no heap memory is available to satisfy the allocation request, at 512, runtime environment 108 initiates a garbage collection process. At 514, garbage collector 132 sweeps through heap 134, freeing unreachable objects (e.g., garbage 404), as well as any weak-referenced or soft-referenced objects, such as balloon objects 136, within heap memory 134. In some embodiments, memory manager 142 may proceed to step 510 and provide the requested balloon object after garbage collection.

At 516, balloon agent 128 determines the virtual addresses of allocated balloon objects 136. In some embodiments, the allocated balloon objects may be zeroed on initialization by runtime environment 108, or alternatively, balloon agent 128 may zero out the guest physical memory pages associated with the virtual addresses. By having the guest physical memory pages associated with balloon objects 136 zeroed out, hypervisor 104 is able to reclaim portions of heap 134 using page sharing. At step 518, balloon agent 128 transmits an indication, or "hint," to hypervisor 104 that the guest physical memory pages backing balloon objects 136 may be candidates for page-sharing. In one implementation, balloon agent 128 may notify hypervisor 104 of the one or more guest physical memory pages associated with balloon objects 136 via a backdoor call. The backdoor call may include the virtual address of the guest physical memory pages. In some implementations, balloon agent 128 may notifies balloon driver 126, which in turn notifies page sharing module 124 of hypervisor 104.

After notifying hypervisor 104, balloon agent 128 may return to step 502 and continue to create balloon objects 136 within heap 134 while runtime environment 108 is idle. At any time, any runtime environment activity (e.g., application objects being allocated) or garbage collection process interrupts the above operations and causes balloon agent 128 to abort or disable passive memory reclamation mode. In some embodiments, responsive to runtime environment 108 resuming operation, balloon agent 128 may configure most or all of references to balloon objects 136 to be weak references, such that balloon objects 136 generally yield to active application data used by runtime environment 108 and applications executing therein.

It should be recognized that hypervisor 104 may utilize the page-sharing hint from balloon agent 128 during a passive page sharing operation, wherein page sharing module 124 continually scans through guest physical memory pages backing VMs $102_1$ to $102_N$ to check for memory pages that may be shared between and amongst virtual machines. By hinting the guest physical memory pages backing balloon objects 136 and relying on passive page sharing, balloon agent 128 enables memory to be reclaimed from heap 134 that otherwise would require balloon agent 128 to actively inflate a memory balloon in heap 134, as performed under traditional techniques. As such, balloon agent 128 provides a mechanism that proactively reclaims memory during initiation or during periods of inactivity for runtime environment 108 based on internal knowledge of runtime environment 128 that is frequently opaque to other processes or layers (e.g., guest OS 106, VMs 102). Accordingly, embodiments of the present disclosure advantageously reduces the need for carefully pre-configured conditions to exist on the host system, as required by conventional "reactive" memory ballooning. Balloon agent 128 detects an appropriate state of VM and runtime environment 108 and proactively configures memory to be reclaimable by hypervisor 104. As such, runtime environment 108 essentially places memory pressure on itself and reduces the amount of waste memory consumed by the guest, without needing a system administrator to manually restrict their available memory. Additionally, since runtime environment 108 (via balloon agent 128) is putting memory pressure on itself, the techniques described herein advantageously identifies and exploits opportunities to reclaim memory, rather than wait until runtime environment 108 is under considerably more memory pressure even during active periods, as seen with traditional application ballooning.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. For example, runtime environment 108 may generally utilize guest virtual memory pages rather than guest physical memory pages and the backdoor call mechanisms (e.g., hypervisor-aware drivers within guest OS 106, etc.) utilized by runtime environment 108 to communicate with hypervisor 104 that may translate guest virtual memory page references received from runtime environment 108 to guest physical memory page references prior to providing them to hypervisor 104. In yet another example, runtime environment 108 may be modified to directly zero out unused portions of heap 134 without utilizing balloon objects 136. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for managing memory of a virtual machine, the method comprising:

determining an idle state of a runtime environment executing on top of a guest operating system in the virtual machine, the runtime environment supporting execution of a plurality of applications which includes a balloon agent;

responsive to determining the idle state, allocating, through the balloon agent running in the runtime environment, a plurality of memory objects within heap memory managed by the runtime environment at a pre-determined allocation rate while the runtime environment remains in the idle state, the heap memory being a portion of guest physical memory reserved for the runtime environment;

writing a predetermined value into at least one machine memory page associated with the allocated memory objects; and notifying a hypervisor that the at least one machine memory page that are associated with the allocated memory objects and have the predetermined value can be reclaimed.

2. The method of claim 1, wherein the idle state of the runtime environment is determined according to an allocation rate of objects for an application executing in the runtime environment.

3. The method of claim 1, wherein the step of allocating the plurality of memory objects further comprises:

maintaining references to the plurality of memory objects, wherein a reference to at least one of the plurality of memory objects indicates that the referenced memory object is available for garbage collection.

4. The method of claim 1, wherein the step of allocating the plurality of memory objects further comprises:

allocating the plurality of memory objects within heap memory of the runtime environment at the pre-determined allocation rate until the occurrence of at least one of: (1) a garbage collection process on the heap of the runtime environment, and (2) activity from an application executing in the runtime environment.

5. The method of claim 1, wherein the step of notifying the hypervisor further comprises:

notifying the hypervisor that the at least one machine memory page that are associated with the allocated memory objects and have the predetermined value are candidates for page-sharing with another machine memory page.

6. A method for managing memory of a virtual machine, the method comprising:

launching a runtime environment executing on top of a guest operating system in a virtual machine and configured to execute one or more applications including a balloon agent, the runtime environment including a heap memory which is a portion of guest physical memory reserved for the runtime environment;

determining, by the balloon agent, a state of high machine memory consumption for the virtual machine, wherein the state of high machine memory consumption is characterized by an amount of guest physical memory being backed by machine memory in excess of a threshold value;

responsive to determining the state of high machine memory consumption for the virtual machine, allocating, through the balloon agent running in the runtime environment, a memory object within the heap memory managed by the runtime environment, the memory object having a predetermined value; and notifying, directly by the balloon agent, a hypervisor that at least one machine memory page associated with the allocated memory object having the predetermined value can be reclaimed.

7. The method of claim 6, wherein the threshold value is calculated relative to a total amount of guest physical memory allocated for the virtual machine.

8. The method of claim 6, wherein the step of allocating the memory object comprises:
allocating a plurality of memory objects within heap memory of the runtime environment, wherein the plurality of memory objects having a total size that is at least half of the size of heap memory.

9. The method of claim 6, wherein the step of allocating the memory object further comprises:
maintaining a reference to the memory object configured to indicate that the memory object is available for garbage collection.

10. The method of claim 6, wherein the step of notifying the hypervisor further comprises:
notifying the hypervisor that the at least one machine memory page that are associated with the allocated memory object and have the predetermined value are candidates for page-sharing with another machine memory page.

11. A non-transitory computer-readable storage medium comprising instructions that, when executed in a computing device, manage memory of a virtual machine by performing the steps of:
determining an idle state of a runtime environment executing on top of a guest operating system in the virtual machine, the runtime environment supporting execution of a plurality of applications which includes a balloon agent;
responsive to determining the idle state, allocating, through the balloon agent running in the runtime environment, a plurality of memory objects within heap memory managed by the runtime environment at a pre-determined allocation rate while the runtime environment remains in the idle state, the heap memory being a portion of guest physical memory reserved for the runtime environment;
writing a predetermined value into at least one machine memory page associated with the allocated memory objects; and
notifying a hypervisor that the at least one machine memory page that are associated with the allocated memory objects and have the predetermined value can be reclaimed.

12. The non-transitory computer-readable storage medium of claim 11, wherein the idle state of the runtime environment is determined according to an allocation rate of objects for an application executing in the runtime environment.

13. The non-transitory computer-readable storage medium of claim 11, wherein the instructions for allocating the plurality of memory objects further comprise instructions for:
maintaining references to the plurality of memory objects, wherein a reference to at least one of the plurality of memory objects indicates that the referenced memory object is available for garbage collection.

14. The non-transitory computer-readable storage medium of claim 11, wherein the instructions for allocating the plurality of memory objects further comprise instructions for:

allocating the plurality of memory objects within heap memory of the runtime environment at the pre-determined allocation rate until the occurrence of at least one of: (1) a garbage collection process on the heap of the runtime environment, and (2) activity from an application executing in the runtime environment.

15. The non-transitory computer-readable storage medium of claim 11, wherein the instructions for notifying the hypervisor further comprise instructions for:
notifying the hypervisor that the at least one machine memory page that are associated with the allocated memory objects and have the predetermined value are candidates for page-sharing with another machine memory page.

16. A non-transitory computer-readable storage medium comprising instructions that, when executed in a computing device, manage memory of a virtual machine by performing the steps of:
launching a runtime environment executing on top of a guest operating system in a virtual machine and configured to execute one or more applications including a balloon agent, the runtime environment including a heap memory which is a portion of guest physical memory reserved for the runtime environment;
determining, by the balloon agent, a state of high machine memory consumption for the virtual machine, wherein the state of high machine memory consumption is characterized by an amount of guest physical memory being backed by machine memory in excess of a threshold value;
responsive to determining the state of high machine memory consumption for the virtual machine, allocating, through the balloon agent running in the runtime environment, a memory object within the heap memory managed by the runtime environment, the memory object having a predetermined value; and
notifying, directly by the balloon agent, a hypervisor that at least one machine memory page associated with the allocated memory object having the predetermined value can be reclaimed.

17. The non-transitory computer-readable storage medium of claim 16, wherein the threshold value is calculated relative to a total amount of guest physical memory allocated for the virtual machine.

18. The non-transitory computer-readable storage medium of claim 16, wherein the instructions for allocating the memory object comprise instructions for:
allocating a plurality of memory objects within heap memory of the runtime environment, wherein the plurality of memory objects having a total size that is at least half of the size of heap memory.

19. The non-transitory computer-readable storage medium of claim 16, wherein the instructions for allocating the memory object further comprise instructions for:
maintaining a reference to the memory object configured to indicate that the memory object is available for garbage collection.

20. The non-transitory computer-readable storage medium of claim 16, wherein the instructions for notifying the hypervisor further comprise instructions for:
notifying the hypervisor that the at least one machine memory page that are associated with the allocated memory object and have the predetermined value are candidates for page-sharing with another machine memory page.

* * * * *